US006717315B1

United States Patent
Tajima et al.

(10) Patent No.: US 6,717,315 B1
(45) Date of Patent: Apr. 6, 2004

(54) PERMANENT MAGNET TYPE MOTOR AND METHOD OF PRODUCING PERMANENT MAGNET TYPE MOTOR

(75) Inventors: Tsuneyoshi Tajima, Tokyo (JP); Tomoaki Oikawa, Tokyo (JP); Osamu Kazama, Tokyo (JP); Koji Masumoto, Tokyo (JP); Masaki Katou, Tokyo (JP); Kazuhiko Baba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 176 days.

(21) Appl. No.: 09/869,322

(22) PCT Filed: Nov. 10, 2000

(86) PCT No.: PCT/JP00/07926
§ 371 (c)(1),
(2), (4) Date: Jul. 24, 2001

(87) PCT Pub. No.: WO01/43259
PCT Pub. Date: Jun. 14, 2001

(30) Foreign Application Priority Data

Dec. 13, 1999 (JP) ............................................. 11-353721

(51) Int. Cl.$^7$ ................................................. H02K 1/27
(52) U.S. Cl. ................................................. 310/156.45
(58) Field of Search ................................. 310/156, 216, 310/261, 262, 218, 214, 314, 186; H02K 21/12

(56) References Cited

U.S. PATENT DOCUMENTS

| 5,363,004 A | * | 11/1994 | Futami et al. | ......... 310/156.53 |
| 5,510,662 A | * | 4/1996 | Tanimoto et al. | ...... 310/156.53 |
| 5,811,904 A | * | 9/1998 | Tajima et al. | .......... 310/156.45 |

FOREIGN PATENT DOCUMENTS

| EP | 0 223 612 | | 5/1987 | |
| EP | E223612 | * | 5/1997 | |
| EP | 0223612 | * | 5/1997 | ............ H02K/1/27 |
| JP | 5-219669 | | 8/1993 | |
| JP | 05219669 | * | 8/1993 | ............ H02K/1/27 |
| JP | 6-339240 | | 12/1994 | |
| JP | 06339240 | * | 12/1994 | ............ H02K/1/27 |
| JP | 7-39090 | | 2/1995 | |
| JP | 11-146582 | | 5/1999 | |
| JP | 11146582 | * | 5/1999 | ............ H02K/1/27 |
| JP | 11-285184 | | 10/1999 | |
| JP | 11285184 | * | 10/1999 | ............ H02K/1/27 |
| JP | 2000-245084 | | 9/2000 | |

OTHER PUBLICATIONS

"Design of Brushless Permanent–Magnet motor" by J.R. Hindershot Jr. and TJE Miller, 1994 Chap.3 pp. 3–1 and 3–23.*

* cited by examiner

Primary Examiner—Dang Le
Assistant Examiner—Karen Addison
(74) Attorney, Agent, or Firm—Oblon, Spivak, McClelland, Maier & Neustadt, P.C.

(57) ABSTRACT

To provide a permanent-magnet motor having a permanent magnet which can reduce the vibration and the noise without lowering the efficiency of the motor, the permanent-magnet motor according to, the present invention has a stator 1 having stator winding of plural phases, a rotor 10 having a stator core 12 facing to inside of the stator across a gap part and a permanent magnet 14 provided to the rotor core. In the permanent-magnet motor, the permanent magnet 14 is made to have both a convex part to the inner diameter side and a convex part to the outer diameter side in the cross section taken vertically to the rotation axis, and a focus of magnetic orientation of each magnetic pole of the permanent magnet is located outside of the rotor 10.

8 Claims, 11 Drawing Sheets

PRIOR ART

Fig.10

PRIOR ART

Fig.11

PRIOR ART

Fig.12

PRIOR ART

Fig.13

PRIOR ART

Fig.14

PRIOR ART

PERMANENT MAGNET TYPE MOTOR AND METHOD OF PRODUCING PERMANENT MAGNET TYPE MOTOR

TECHNICAL FIELD

The present invention relates to a permanent-magnet motor and its manufacturing method used for such as an air conditioner and a compressor for a refrigerator.

BACKGROUND ART

Related Art 1.

Figure 9:
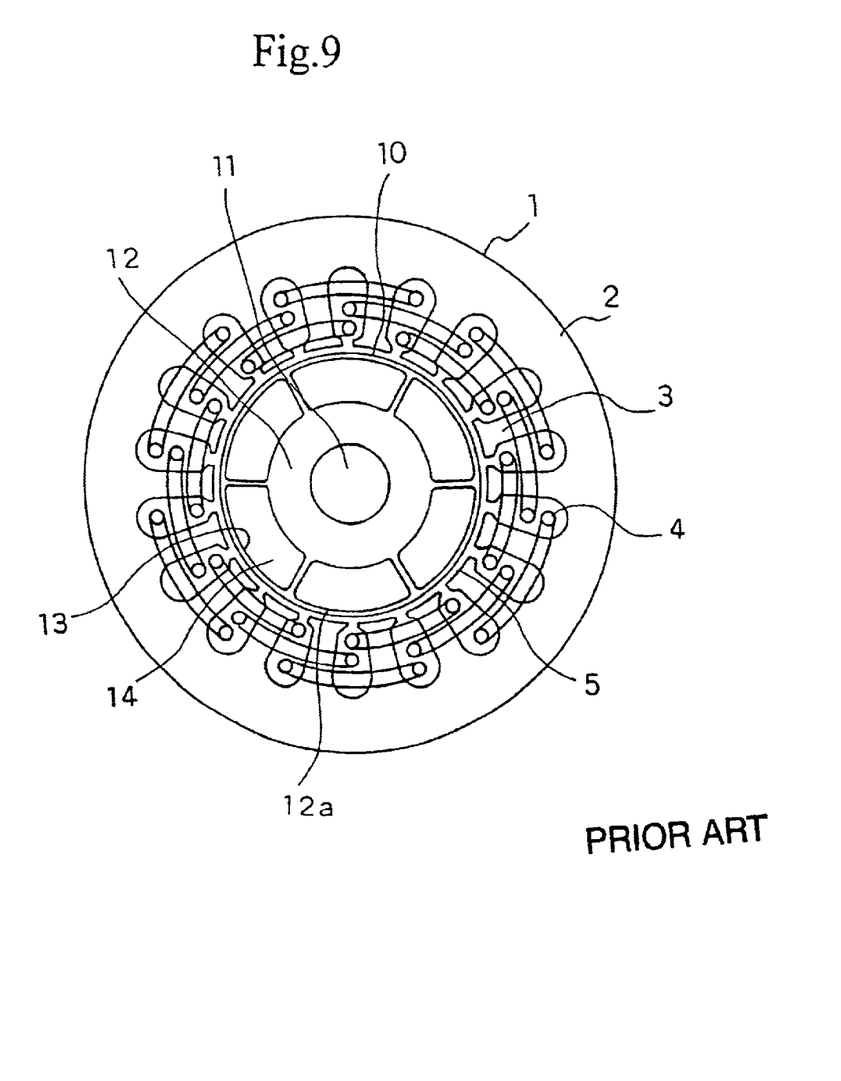
FIG. 9 shows a conventional permanent-magnet motor.

FIG. 9 shows a conventional permanent-magnet motor.

In FIG. 9, a stator 1 consists of a circular stator core 2, plural teeth 3 provided to the stator core 2, and coils 4 wound around the teeth 3. The stator 1 is, for example, a distributed winding stator having stator winding of plural phases.

Inside of the stator 1, a rotor 10 is placed rotatably with a gap 5. The rotor 10 has a rotation axis 11 and a rotor core 12 provided around the rotation axis 11.

As shown in the figure, the permanent-magnet motor, in which a permanent magnet is used for a rotor of the motor, is formed by inserting plural permanent magnets 14, each of which has an arc in the view of its cross section, into a rotor core 12 having plural containing holes 13 provided near the peripheral part for inserting the plural permanent magnets. Each permanent magnet 14 is placed so that the convex part should face to an outside.

Figure 10:
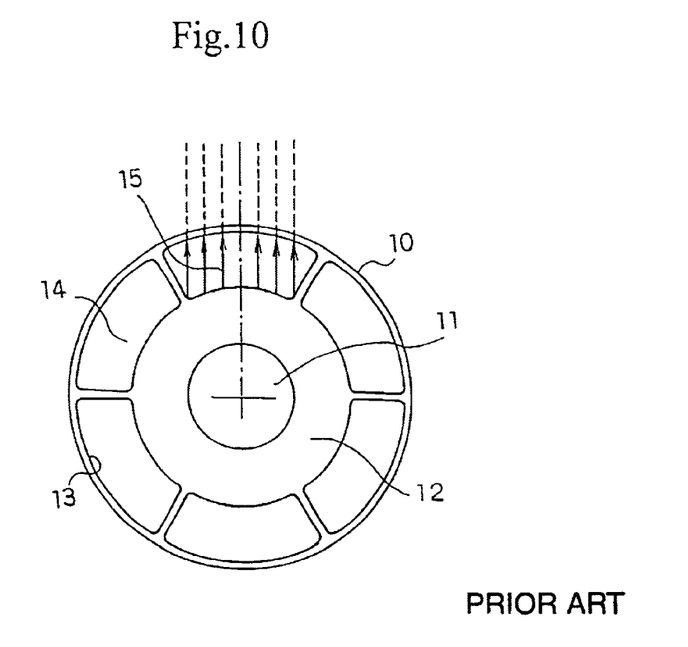
FIG. 10 shows magnetic orientation status of the conventional permanent-magnet motor.

Each permanent magnet 14 is magnetized so that magnetic orientation 15 of each piece should be parallel with a direct line connecting the center of the rotor 10 and the center part of the circumference of the permanent magnet 14, namely, the center of the magnetic orientation should be infinite. The rotor core 12 is made by multilayering multiple silicon steel plates respectively having the containing holes 13.

Figure 11:
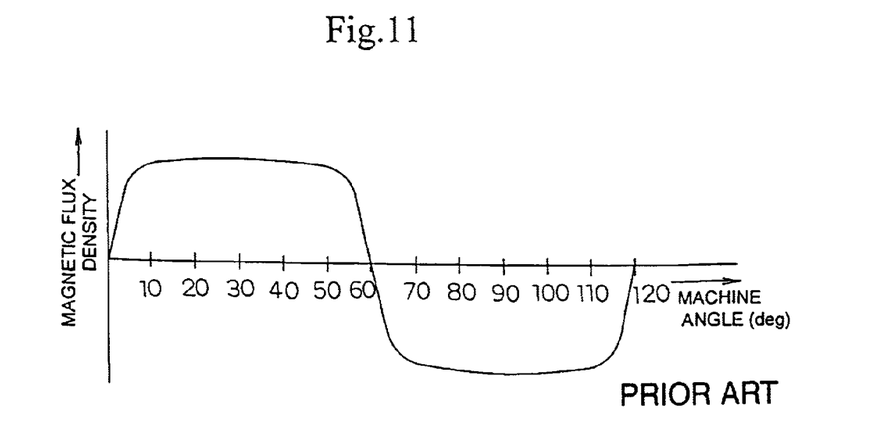
FIG. 11 is a distribution diagram of magnetic flux density.

However, as for the permanent-magnet motor structured according to the first related art, the distribution of the magnetic flux density of the gap between the rotor 10 and the stator 1, generated by the permanent magnet 14, is in a wave form as shown in FIG. 11. Since this wave form is much different from sine wave, a problem is raised such as large cogging torque and much vibration and noise.

Related Art 2.

Figure 12:
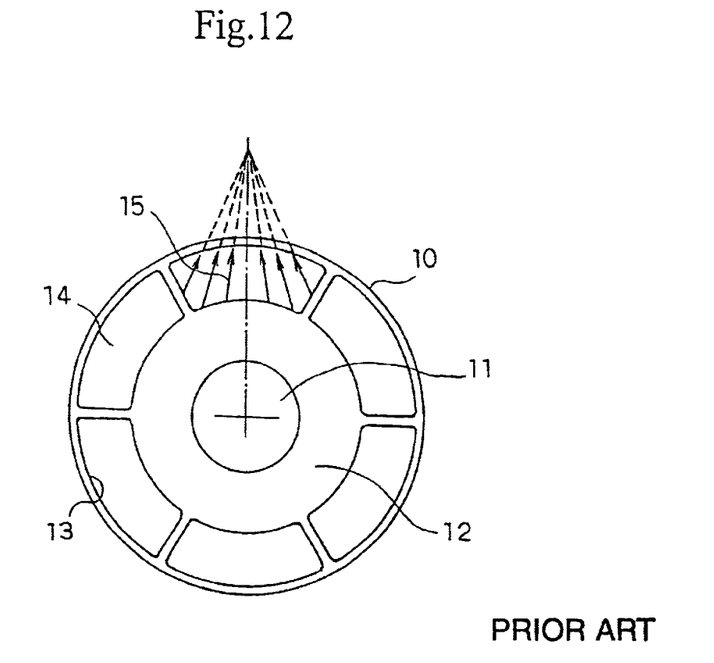
FIG. 12 shows another magnetic orientation status of the conventional permanent-magnet motor.

To solve the above problem, another technique has been developed as shown in FIG. 12. The rotor 10 of the figure is magnetized so that the focus of the magnetic orientation 15 of each piece of the permanent magnet 14 should be located outside of the rotor 10.

Figure 13:
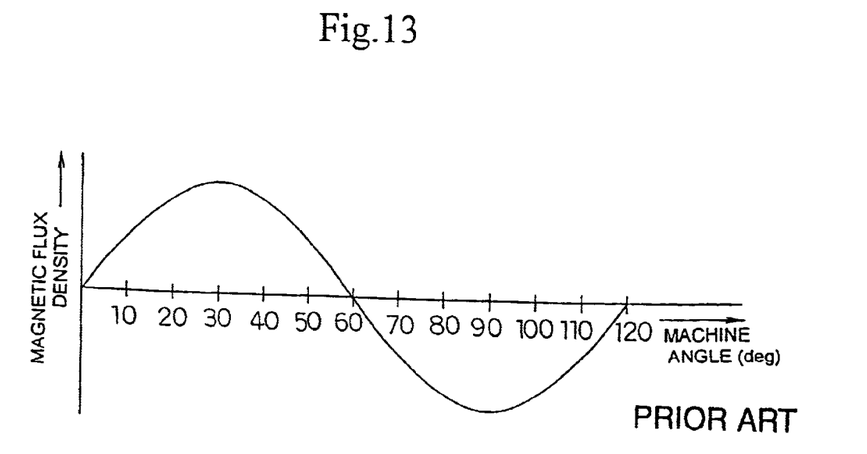
FIG. 13 is a distribution diagram of magnetic flux density.

Using the above means, the magnetic flux density of the gap becomes high at the center part of the magnetic pole, while the density becomes low at both ends of the magnetic pole. Consequently, the distribution of the magnetic flux density of the gap resembles to the sine wave, which enables to decrease the cogging torque and also reduce the vibration and the noise.

However, in the motor structured as described above, the magnetic orientation 15 should be focused to the convex part of the permanent magnet 14 on producing the permanent magnet 14. That is, the center of the magnetic orientation is placed in the opposite direction to the center of the arc formed due to the shape of the permanent magnet itself, which causes to differentiate the direction of the magnetic flux from the direction of compression at manufacturing process of the permanent magnet. Consequently, the residual magnet flux density becomes low, accompanied by reducing the efficiency of the motor.

Related Art 3.

Figure 14:
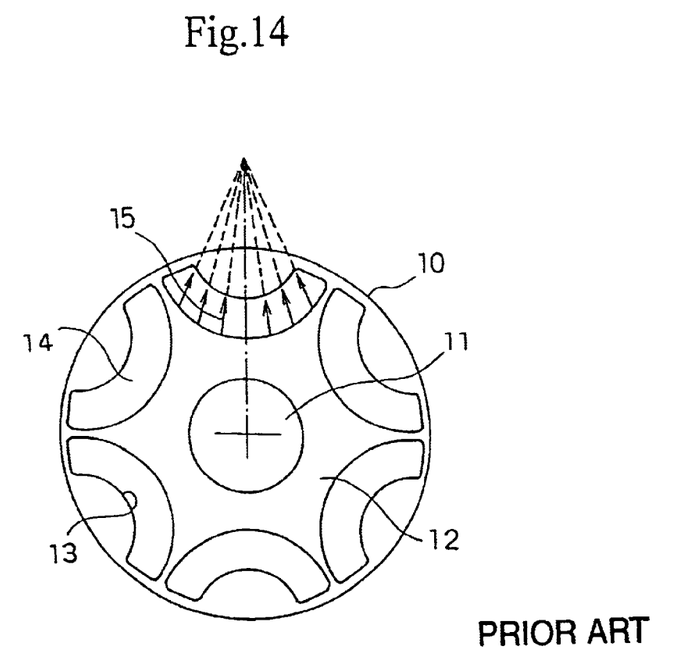
FIG. 14 shows another magnetic orientation status of the conventional permanent-magnet motor.

Another means to solve the problem raised in the above first related art can be considered as a structure shown in FIG. 14. In this rotor 10, the convex part of each piece of the permanent magnet 14 is placed so as to face the inside of the rotor core 12, and each piece of the permanent magnet is magnetized so that the focus of the magnetic orientation of each piece of the permanent magnet 14 is located outside of the rotor 10.

Figure 15:
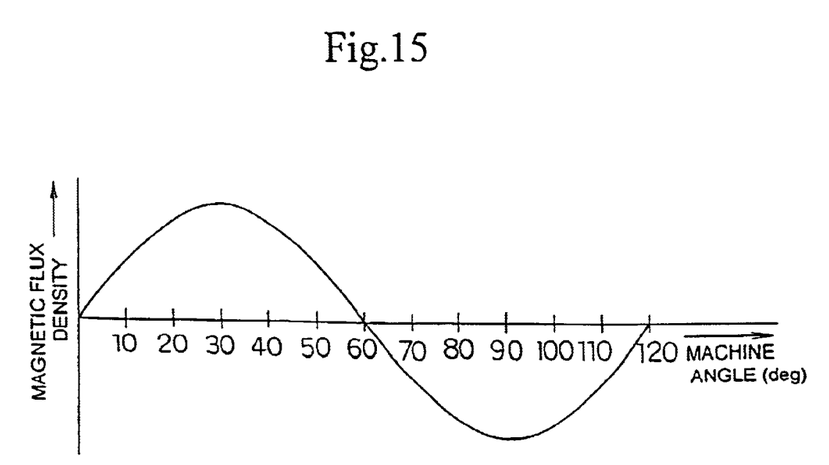
FIG. 15 is a distribution diagram of magnetic flux density.

Employing the above means, the distribution of the magnetic flux density of the gap is high at the center part of the magnetic pole and low at the both ends. That is, the distribution becomes close to the sine wave as shown in FIG. 15. Accordingly, the cogging torque can be decreased, the vibration and the noise can be reduced. On manufacturing the permanent magnet 14, the magnetic orientation 15 can be focused at the concave part of the permanent magnet 14. Namely, the center of the magnetic orientation becomes in the same direction to the center of the arc formed due to the shape of the permanent magnet itself, and therefore, the direction of compression at producing the permanent magnet also becomes the same to the direction of the magnetic flux. The residual magnetic flux density is not lowered nor the efficiency of the motor becomes worse.

Figure 16:
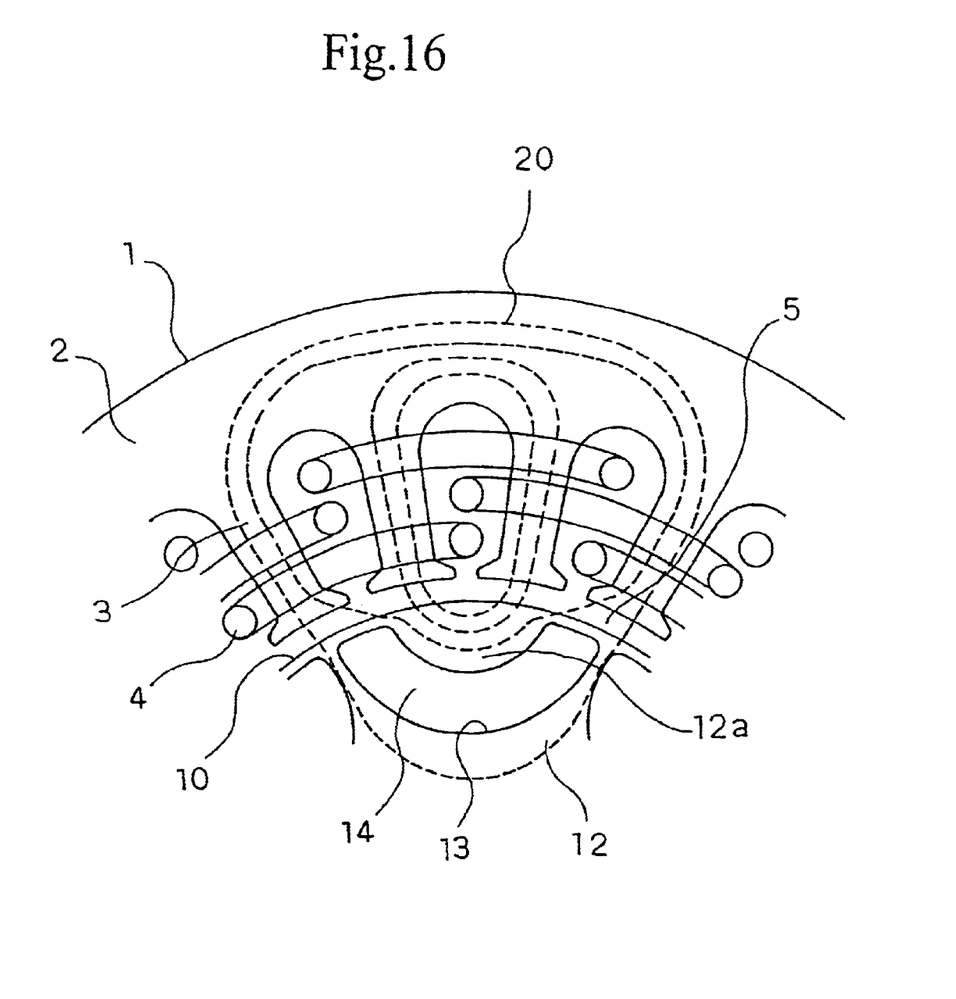
FIG. 16 is a partial enlarged view of FIG. 14.

However, in the structure of the rotor according to the third related art explained above, the thickness of a rotor core part 12a which separates the gap 5 and each of the permanent magnet 14 becomes increased, and the magnetic resistance becomes low. Consequently, among magnetic flux 20 generated by electric current of the coil 4, the amount of the magnetic flux which passes through the rotor core part 12a and short-circuits with the teeth 3 of the stator core 2 becomes large. Accordingly, the torque ripple generated by the fundamental wave component and higher harmonic wave component also becomes increased, which causes to enlarge the vibration and the noise.

The present invention aims to provide, for example, a permanent-magnet motor, having a permanent magnet, which can reduce the vibration and the noise without decreasing the efficiency of the motor and a manufacturing method for the permanent-magnet motor.

Disclosure of the Invention

According to the preferred embodiment of the present invention, a permanent-magnet motor and a manufacturing method for the permanent-magnet having:
  a stator having stator winding of plural phases; and
  a rotor facing to inside of the stator across a gap part, and having a rotor core and a permanent magnet-provided to the rotor core,
  wherein the permanent magnet is made so as to have both of a convex part to an inner diameter side and a convex part to an outer diameter side in a cross section taken vertically to an axis; and
  wherein a focus of magnetic orientation of each magnetic pole of the permanent-magnet is located outside of the rotor.

Further, the rotor is formed by a rotor core assembly made by multilayering multiple pieces of core laminations, each having plural containing holes for inserting the permanent magnets, and the permanent magnets are inserted into the containing holes for inserting the permanent magnets and a thickness of the rotor core, which separates the permanent magnet and the gap, is made within ±30% of a thickness of the rotor core lamination.

Further, the rotor is formed by including the permanent magnets in an outer peripheral part of the rotor core and a non-magnetic protect pipe is attached around the permanent magnets.

Further, when a radius of an arc of an outer diameter side of the containing hole provided to the rotor core for inserting the permanent magnet is R, and a radius of an arc of an outer diameter side of the permanent magnet inserted into the containing hole is r, it is set as R<r.

Further, in the permanent-magnet motor, in which a thickness of the rotor core separating the permanent magnet and the gap part is made within ±30% of a thickness of the multiple rotor core laminations, the stator is a concentrated winding stator made by directly winding a coil around a teeth part of the stator.

Further, a radius of the convex part to the inner diameter side of the permanent magnet is smaller than a radius of the convex part to the outer diameter side of the permanent magnet.

Yet further, a straight line part is provided to each of a part of an arc of an inner diameter side of the containing hole for inserting the permanent magnet and a part of an arc of an inner diameter side of the permanent magnet.

BEST MODE FOR CARRYING OUT THE INVENTION

Embodiment 1

In the following, the first embodiment of the present invention will be explained by referring to the figures.

Figure 1:
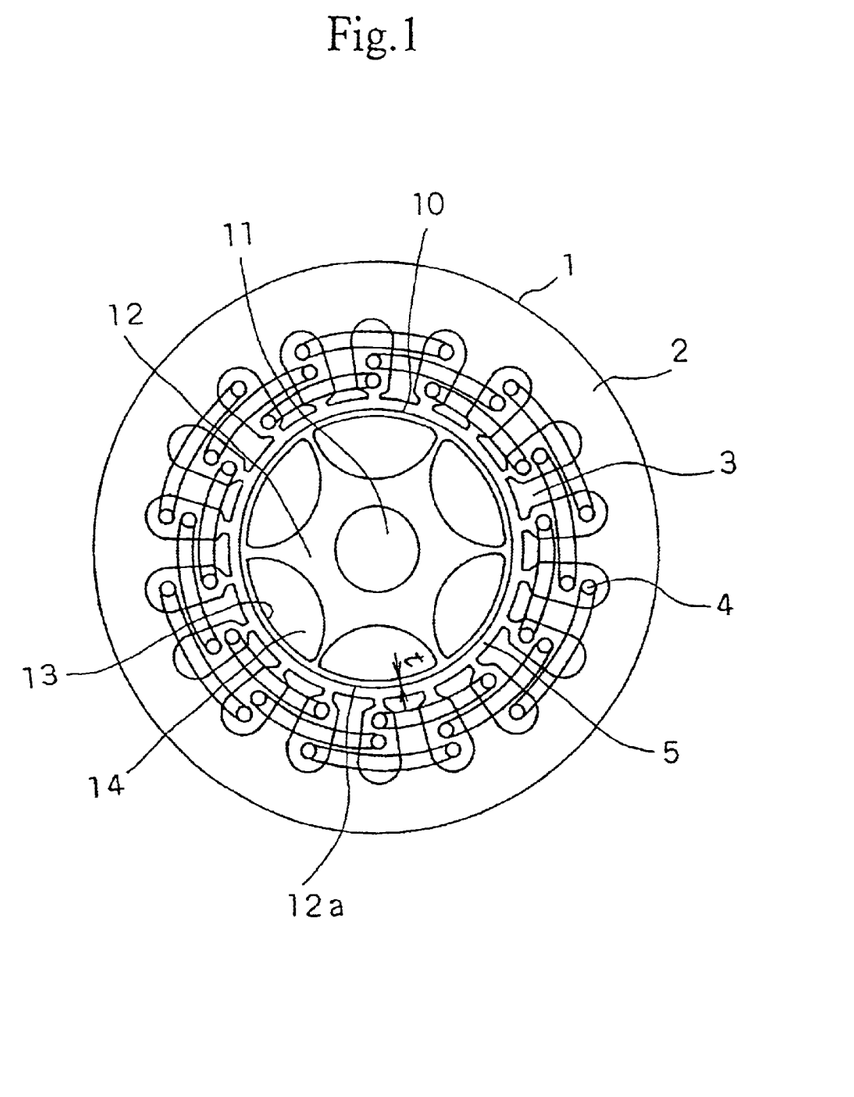
FIG. 1 shows the first embodiment and illustrates a permanent-magnet motor.
Figure 2:
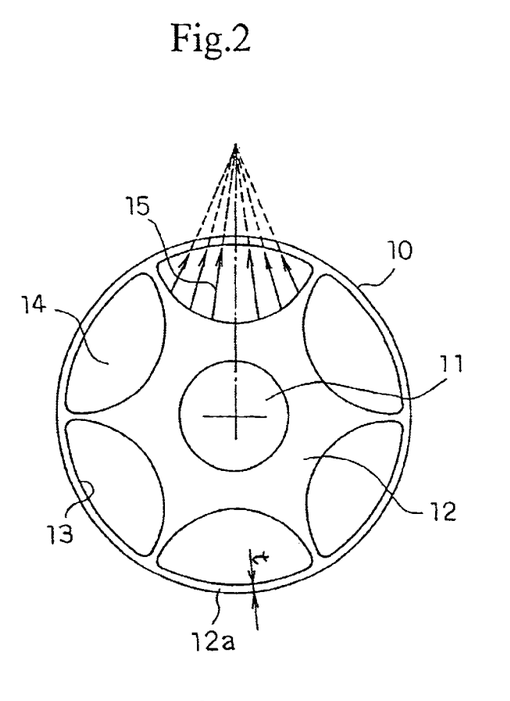
FIG. 2 shows the first embodiment and illustrates a magnetic orientation status of the permanent magnet.
Figure 3:
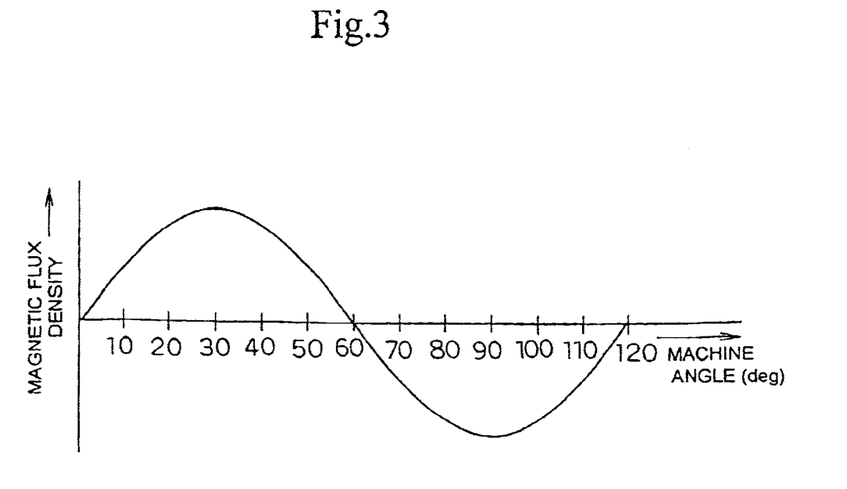
FIG. 3 shows the first embodiment and is a distribution diagram of magnetic flux density.
Figure 4:
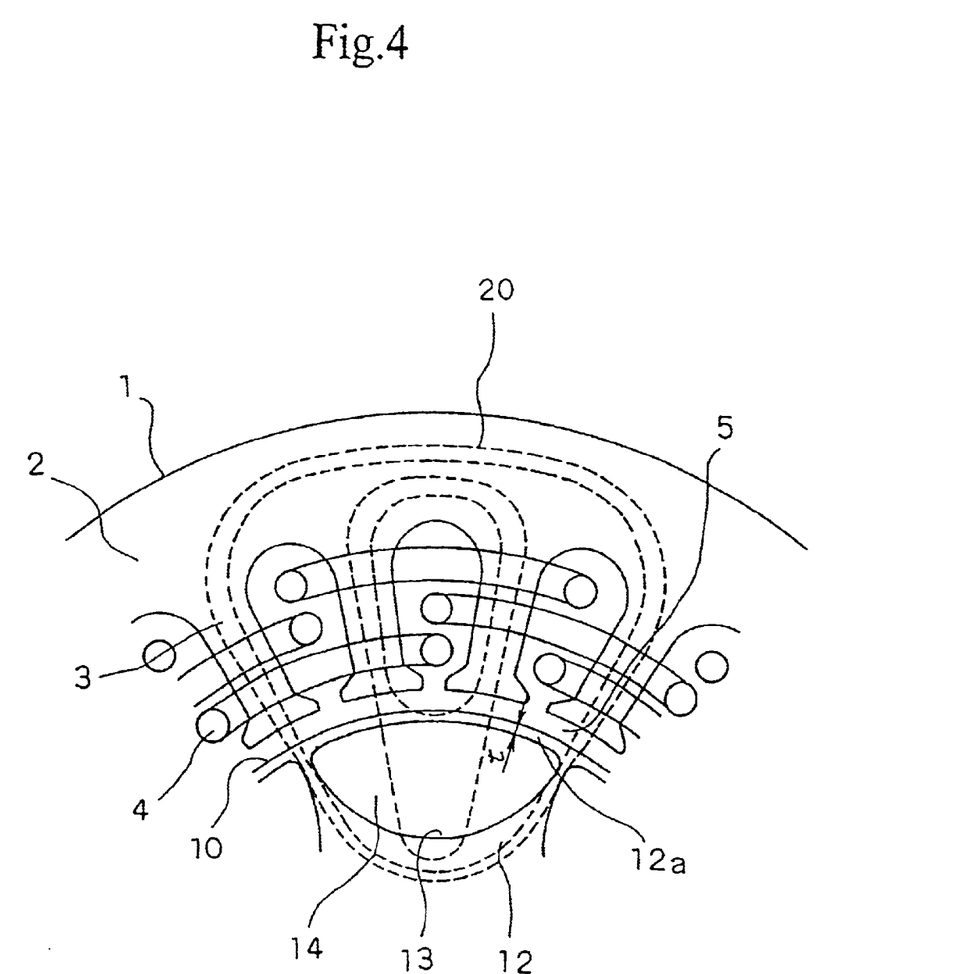
FIG. 4 shows the first embodiment and is a partial enlarged view of FIG. 1.

FIGS. 1 through 4 shows the first embodiment: FIG. 1 shows a permanent-magnet motor; FIG. 2 shows magnetic orientation status of a permanent magnet; FIG. 3 is a distribution diagram of magnetic flux density; and FIG. 4 shows a partial enlarged view of FIG. 1.

In FIG. 1, a stator 1 includes a circular stator core 2, plural teeth 3 provided to the stator core 2, and coils 4 wound around these teeth 3. The stator 1 is, for example, a distributed winding stator having stator winding of plural phases.

Inside of the stator 1, a rotor 10 is placed rotatably with a gap 5. The rotor 10 has a rotation axis 11 and a rotor core 12 provided around the rotation axis 11. A permanent magnet is inserted from the direction of the axis into a containing hole 13 for inserting the permanent magnet. The rotor core 12 has a multilayered rotor core assembly formed by multilayering multiple pieces of silicon steel plates, each of which is called a punched rotor core lamination and has the containing holes 13 punched, in the direction of the rotation axis 11 (that is, vertically to a sheet of FIG. 1).

The containing hole 13 provided to the rotor core 12 has a shape being convex to both inner diameter side and outer diameter side in the cross section taken vertically to the rotation axis 11. Further, the thickness t in the diameter direction of a rotor core part 12a, which separates the permanent magnet 14 and the gap 5, is set within ±30% of the thickness of the rotor core lamination. For example, if the thickness of one piece of the rotor core lamination is 0.5 mm, the thickness t of the rotor core part 12a in the diameter direction becomes 0.35 mm through 0.65 mm.

Given a radius of an arc of the outer diameter side of the containing hole 13 provided to the rotor core 12 is R, and a radius of the outer circle of the rotor 10 is R', it is set as R<R'. The arc of the outer diameter side of the containing hole 13 is set to be a part of a circumference of a circle whose center is the same to the center of the outer circle of the rotor 10. Consequently, the thickness t of the rotor core part 12a in the diameter direction has a constant value.

Further, the permanent magnet 14 has a substantially similar shape to the containing hole 13 and is magnetized so that the N pole and the S pole are located alternately and so that the focus of magnetic orientation of each part is located outside of the rotor 10 as shown in FIG. 2.

In the permanent-magnet motor structured as described above, the distribution of the magnetic flux density of the gap caused by the permanent-magnet 14 becomes large at the center part of the magnetic pole and small at the both ends, which becomes resemble to the sine wave as shown in FIG. 3. Accordingly, the cogging torque can be decreased, and the vibration and the noise can be reduced.

In case of FIG. 2, the focus of the magnetic orientation 15 is one place, however, the same effect can be, obtained even if the focus becomes placed separately at multiple places as long as the focus is placed outside of the rotor 10.

Although the magnetic orientation is set so that the focus should be located outside of the rotor 10, the residual magnetic flux density cannot be decreased. This is because the compression direction at forming the permanent magnet becomes almost the same to the direction of the magnetic flux when the cross section of the permanent magnet 14 is shaped convex to the inner diameter side, and a radius R of the convex part of the inner diameter side is set to be smaller than a radius R of the outer diameter side as shown in FIG. 1.

On the contrary to the case of FIG. 1, when it is desired that the radius R of the convex part of the inner diameter side is larger than the radius R of the convex part of the outer diameter side, at forming time of the permanent magnet, at first, the radius R of the convex part of the inner diameter side is formed so as to be smaller than the radius R of the outer diameter side. Thereafter, the permanent magnet is ground so that the radius R of the outer diameter side becomes smaller. This brings the same effect to the case of FIG. 1.

As has been described, since the residual magnetic flux density of the permanent magnet 14 itself is not decreased, the efficiency of the motor is not lowered, either.

Further, both the containing hole 13 and the permanent magnet 14 have a convex shape to the outer diameter side, and the thickness t in the diameter direction of the rotor core part 12a, which separates the gap 5 and each piece of the permanent magnet 14, is made thin. Therefore, the magnetic resistance of the rotor core part 12a becomes large, and the number of magnetic flux passing through the rotor core part 12a, which separates the gap 5 and each piece of the permanent magnet 14, can be limited as shown in FIG. 4. Consequently, among the magnetic flux 20 generated by electric current of the coil 4, an amount of the magnetic flux short-circuited between the rotor core part 12a and the teeth 3 of the stator core 2 can be decreased. The torque ripple generated by the higher harmonic wave component of the magnetic flux can be decreased, which enables to reduce the vibration and the noise.

In the above case, the thickness t in the diameter direction of the rotor core part 12a is desired to be within +30% of the thickness of the lamination in consideration of the characteristic of the rotor core lamination and the magnetic resistance. Namely, making the thickness t of the rotor core part 12a in the diameter direction too small causes to destroy the rotor core part 12a on punching the rotor core lamination. On the contrary, if the thickness t of the rotor core part 12a in the diameter direction is made too large, the number of the magnetic flux passing through the rotor core part 12a separating the gap 5 and each piece of the permanent magnet 14 cannot be decreased.

Embodiment 2

Hereinafter, the second embodiment of the present invention will be explained referring to the figure.

Figure 5:
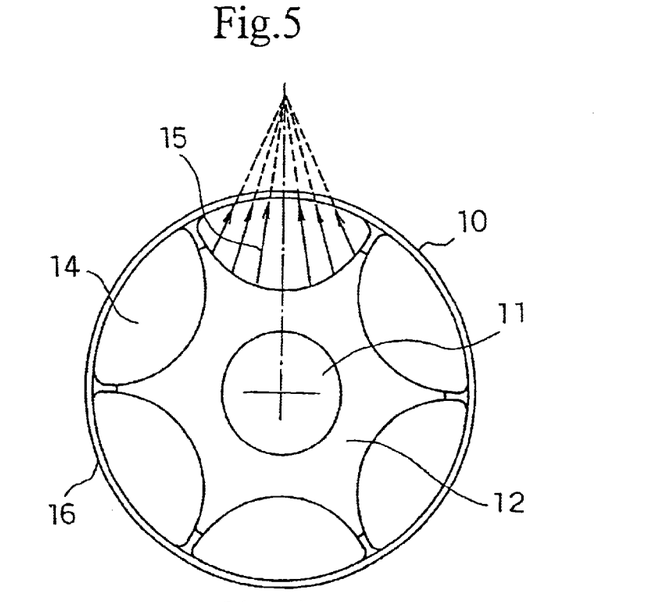
FIG. 5 shows the second embodiment and illustrates a rotor of the permanent-magnet motor.

FIG. 5 shows the second embodiment and illustrates the rotor of the permanent-magnet motor. As shown in FIG. 5, the permanent magnet 14 is placed at the outer peripheral part of the rotor core 12, and the permanent magnet 14 is protected by attaching a non-magnetic pipe 16 around the permanent magnet. By this structure, the magnetic flux short-circuited between the rotor core 12 and the stator core 2 can be further decreased, and accordingly, the torque ripple can be also decreased, which enables to reduce the vibration and the noise.

Embodiment 3

Hereinafter, the third embodiment of the present invention will be explained referring to the figure.

Figure 6:
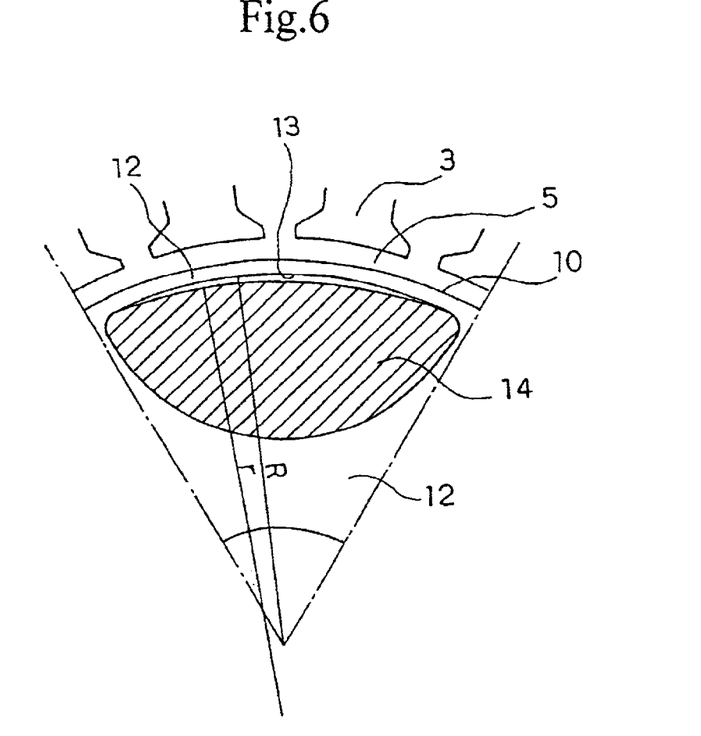
FIG. 6 shows the third embodiment and illustrates the rotor of a single pole.

FIG. 6 shows the third embodiment and illustrates one pole of the rotor. As shown in the figure, when the radius of the arc of the outer diameter side of the containing hole 13 provided to the rotor core 12 is R, and the radius of the arc of the outer diameter side of the permanent magnet 14 is r, it is set as R<r. Therefore, the rotor core part 12a separating the permanent magnet 14 and the gap 5 is not contacted to the permanent magnet 14 at around the center part of the circumference of the permanent magnet 14. Large moment of inertia influenced to both ends from around the center part of the rotor core part 12a due to the centrifugal force generated, by high-speed rotation of the rotor 10 can be taken out, which enables to decrease shearing stress. Consequently, the present embodiment can prevent deformation and break of the rotor.

Embodiment 4

Hereinafter, the fourth embodiment of the present invention will be explained referring to the figure.

Figure 7:
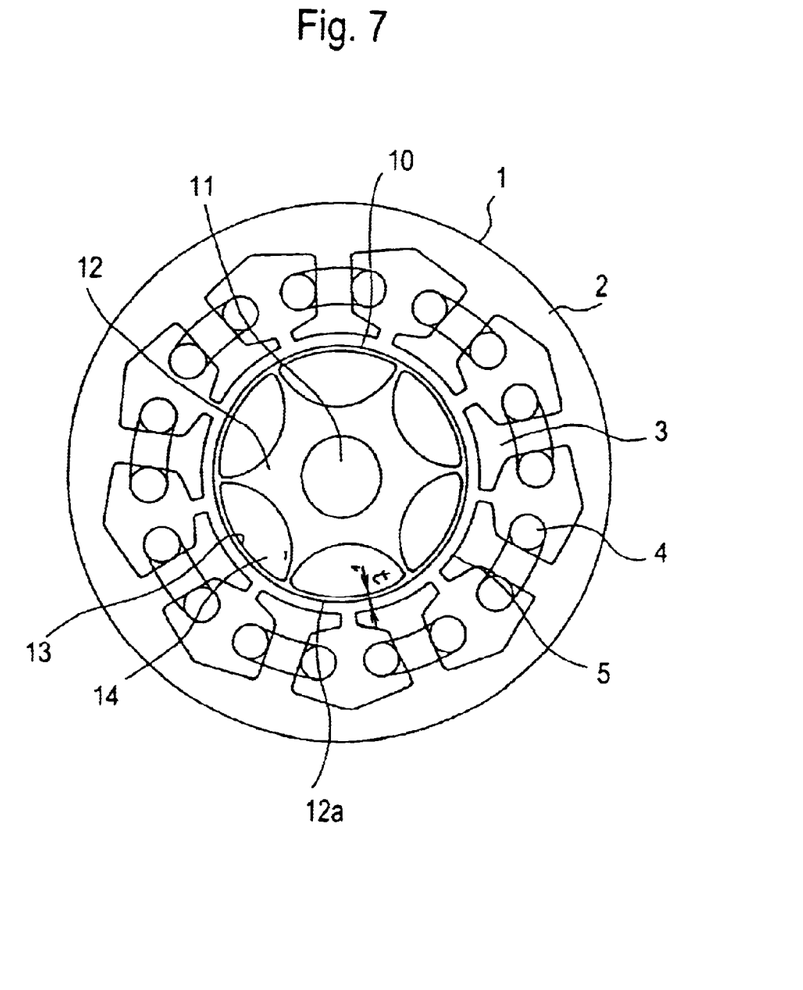
FIG. 7 shows the fourth embodiment and illustrates the permanent-magnet motor.

FIG. 7 shows the fourth embodiment and illustrates the permanent-magnet motor. In the first through third embodiments, the stator is the distributed winding stator. As shown in FIG. 7, the stator 1 of the present embodiment is a concentrated winding stator including a circular stator core 2, plural teeth 3 formed on the stator core 2, and a coil 4 directly wound around the teeth 3, which brings the following advantage.

In the concentrated winding stator, among the magnetic flux generated by the electric current of the coil 4, the magnetic flux, which passes through the rotor core part 12a separating the gap 5 and each piece of the permanent magnet 14 and short-circuits between the rotor core part 12a and the teeth 3 of the stator core 2, influences to the vibration and the noise more than the distributed winding. Therefore, more efficient reduction of the torque ripple, namely, of the vibration and the noise can be obtained by setting the thickness t in the diameter direction of the rotor core part 12a, which separates the gap 5 and each piece of the permanent magnet 14, to be within ±30% of the thickness of the rotor core lamination.

Recently, another type of the concentrated winding stator has been proposed for obtaining higher efficiency due to the high coil space actor of the coil 4: such as single winding of the teeth 3 made by dividing the stator core 2; and directly winding the teeth by opening and holding the iron core to straight or inversely warped. These kinds of stator have a problem that the rigidity of the stator has been weakened due to the division, which may cause to enlarge the vibration and the noise. Accordingly, it is more efficient to employ the present embodiment to increase the efficiency and reduce the vibration and the noise.

Embodiment 5

In the following, the fifth embodiment of the present invention will be explained referring to the figure.

Figure 8:
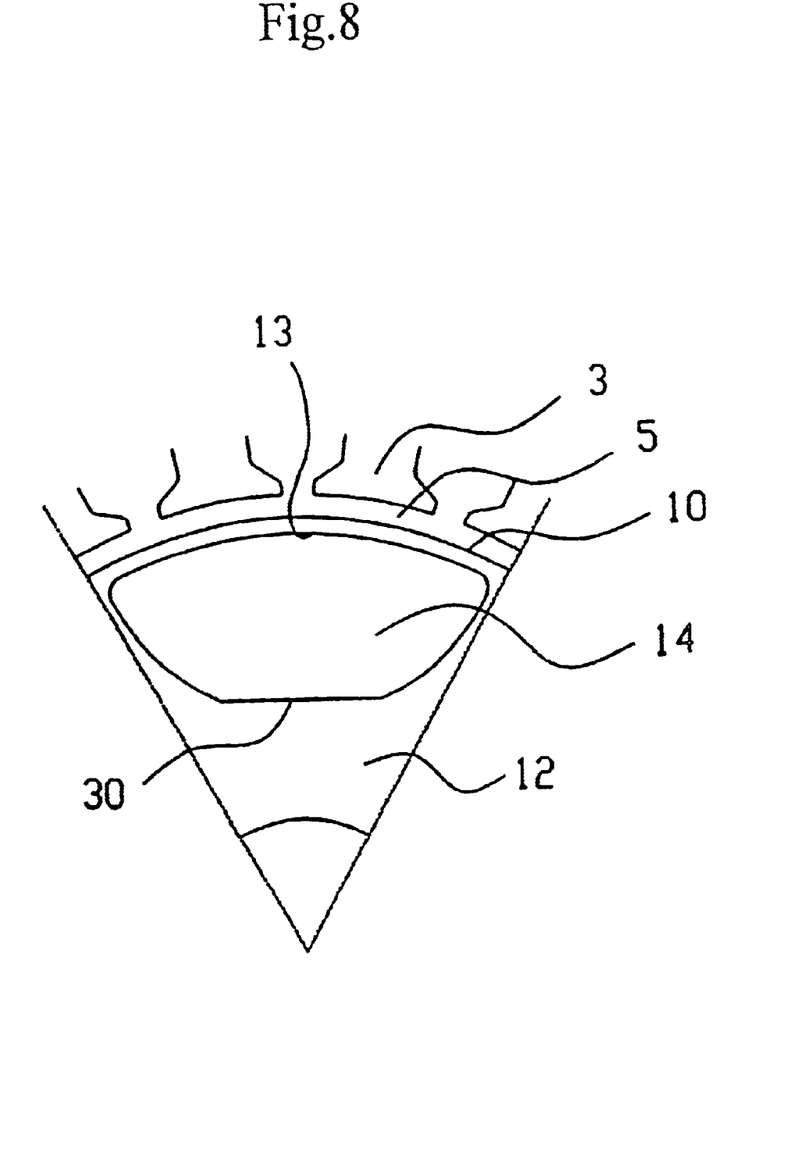
FIG. 8 shows the fifth embodiment and illustrates the rotor of a single pole.

FIG. 8 shows the fifth embodiment and illustrates one pole of the rotor. As shown in the figure, a straight line part 30 is provided to each of a part of the arc of inner diameter side of the containing hole 13 of the permanent magnet provided to the rotor core 12 and a part of the arc of the inner diameter side of the permanent magnet 14, which brings the following advantages.

Since the straight line part 30 is provided to the part of the arc of the permanent magnet 14, a difference of the thickness between the center part of the permanent magnet and the both ends is decreased. Accordingly, a difference of the compression ratio at producing the permanent magnet is lowered, which reduces defective product having a clack or a chip.

Further, by providing the straight line part 30 to the part of the arc of the permanent magnet 14, the permanent magnet can fit to the equipment at grinding process after forming, which enables to easily obtain the accuracy. Accordingly, the number of cases producing the permanent magnet 14 having wrong size can be reduced, and further, the number of cases of defective insertion into the rotor core 12 at inserting process can be also reduced.

Yet further, since the straight line part 30 is provided to the arc of the inner diameter side, not to the outer diameter side, the amount of the magnetic flux short-circuited between the rotor core part 12a and the teeth 3 of the stator core 2 does not change, nor the torque ripple generated by the higher harmonic wave component of the magnetic flux increases.

The present invention is not limited to each of embodiments described above and shown in the drawings. The invention can be embodied by modifying the embodiments within the scope which does not deviate the intention, for example, the number of the permanent magnet 14 can be other than six.

Industrial Applicability

According to the preferred embodiment of the present invention, in the permanent-magnet motor, the permanent magnet is made so as to have a shape in which both of the inner diameter side and the outer diameter side are convex in the cross section taken vertically to the axis, and further, the focus of the magnetic orientation of each magnetic pole of the permanent magnet is located outside of the rotor. Therefore, the distribution of the magnetic flux density of the gap is high at the center part and law at both ends, which resembles the sine wave. Accordingly, the cogging torque can be decreased, and the vibration and the noise can be reduced. Further, since the magnet can be produced without decreasing the residual magnetic flux density, the efficiency of the motor cannot be lowered.

Further, in the rotor, the rotor core assembly is formed by multilayering multiple pieces of rotor core laminations, each having plural containing holes for inserting the permanent magnets. The permanent magnet is inserted into the containing hole for inserting the permanent magnet, and further, the thickness of the rotor core, which separates the permanent magnet and the gap, is made within ±30% of the thickness of the rotor core lamination. Therefore, within the magnetic flux generated by the electric current of the coil of the stator, the amount of the magnetic flux short-circuited between the rotor core part and the teeth of the stator core can be decreased. Consequently, the torque ripple generated by the higher harmonic wave component of the magnetic flux can be decreased, and the vibration and the noise can be reduced.

Further, since the rotor is formed by inserting the permanent magnet to the outer peripheral part of the rotor core and attaching the non-magnetic protect pipe around the permanent magnet, the amount of the magnetic flux short-circuited between the rotor core part and the teeth of the stator core can be further decreased.

Further, when the radius of the arc of the outer diameter side of the containing hole for inserting the permanent magnet provided to the rotor core is R, and the radius of the arc of the outer diameter side of the permanent magnet inserted into the containing hole is r, it is set as R<r. Consequently, the rotor core part separating the permanent magnet and the gap does not contact to the permanent magnet at around center part in the circumference of the permanent magnet, which prevents the deformation and the break of the rotor due to the centrifugal force generated by high-speed rotation of the rotor.

Further, in the permanent-magnet motor, the thickness of the rotor core separating the permanent magnet and the gap is set within ±30% of the thickness of the rotor core lamination, and the concentrated winding stator made by directly winding the coil is provided to the teeth part of the stator. Therefore, the reduction of the torque ripple, namely, of the vibration and the noise can be made more efficiently by setting the thickness of the rotor core part separating the gap and the permanent magnet in the diameter direction within ±30% of the thickness of the rotor core lamination.

Further, since the radius of the convex of the inner diameter side of the permanent magnet is made smaller than the radius of the convex of the outer diameter side, the compression direction at forming the permanent magnet becomes almost the same to the direction of the magnetic flux, and the residual magnetic flux density is not decreased.

Further, the straight line parts are provided to the part of the containing hole for inserting the permanent magnet and the part of the arc of the inner diameter side of the permanent magnet, a difference of the compression ratio at producing the permanent magnet is decreased, which can reduce defective product having a clack or a chip.

Further, the permanent magnet can fit to the equipment at grinding process after forming, which enables to easily obtain the accuracy. Accordingly, the number of cases producing the permanent magnet having wrong size can be decreased, and further, the number of defective insertion into the rotor core at inserting process can be also decreased.

Yet further, since the amount of the magnetic flux short-circuited between the rotor core and the teeth of the stator core is not increased, nor the torque ripple generated by the higher harmonic wave component of the magnetic flux increases.

What is claimed is:

1. A permanent-magnet motor comprising:
   a stator having stator winding of plural phases; and
   a rotor facing to inside of the stator across a gap part, and having a rotor core and a permanent magnet provided to the rotor core,
   wherein the permanent-magnet is made so as to have both of a convex part to an inner diameter side and a convex part lo an outer diameter side in a cross section taken vertically to an axis;
   wherein a focus of magnetic orientation of each magnetic pole of the permanent magnet is located outside of the rotor,
   wherein the rotor is formed by a rotor core assembly made by multilayering multiple pieces of core laminations, each having plural containing holes for inserting the permanent magnets and the permanent magnets are inserted into the containing holes for inserting the permanent magnets; and
   wherein a thickness of the rotor core, which separates the permanent magnet and the gap, is made within ±30% of a thickness of the rotor core lamination.

2. The permanent-magnet motor of claim 1, wherein the rotor is formed by including the permanent magnets in an outer peripheral part of the rotor core and a non-magnetic protect pipe is attached around the permanent magnets.

3. The permanent-magnet motor of claim 1,
   wherein when a radius of an arc of an outer diameter side of the containing hole is R, and a radius of an arc of an outer diameter side of the permanent magnet inserted into the containing hole is r, it is set as R<r.

4. The permanent-magnet motor of claim 1, wherein the stator is a concentrated winding stator made by directly winding a coil around a teeth part of the stator.

5. The permanent-magnet motor of claim 1, wherein a radius of the convex part to the inner diameter side of the permanent magnet is smaller than a radius of the convex part to the outer diameter side of the permanent magnet.

6. The permanent-magnet motor of claim 1, wherein a straight line part is provided to each of a part of an arc of an inner diameter side of the containing hole for inserting the permanent magnet and a part of an arc of an inner diameter side of the permanent magnet.

7. A permanent-magnet motor comprising:

a stator having stator winding of plural phases; and a rotor facing to inside of the stator across a gap part, and having a rotor core and a permanent magnet provided to the rotor core, wherein the permanent magnet is made so as to have both of a convex part to an inner diameter side and a convex part to an outer diameter side in a cross section taken vertically to an axis, wherein the rotor is formed by a rotor core assembly made by multilayering multiple pieces of core laminations, each having plural containing holes for inserting the permanent magnets and the permanent magnets are inserted into the containing holes for inserting the permanent magnets; and wherein a thickness of the rotor core, which separates the permanent magnet and the gap, is made within ±30% of a thickness of the rotor core lamination.

8. A method for manufacturing a permanent-magnet motor including a stator having stator winding of plural phases and a rotor facing to inside of the stator across a gap part, and having a rotor core and a permanent magnet provided to the rotor core, the method comprising:

making the permanent magnet so as to have both a convex part to an inner diameter side and a convex part to an outer diameter side in a cross section taken vertically to an axis forming a rotor core assembly by multilayering multiple rotor core laminations, each having plural containing holes for inserting the permanent magnets; and inserting the permanent magnets into the plural containing holes for inserting the permanent magnets, wherein a thickness of the rotor core, which separates the permanent magnet and the gap part, is made within ±30% of a thickness of the multiple rotor core laminations.

* * * * *